United States Patent [19]
Brunken, Sr.

[11] Patent Number: 6,028,283
[45] Date of Patent: Feb. 22, 2000

[54] ASSEMBLY AND METHOD FOR WELDING

[75] Inventor: Gerald W. Brunken, Sr., Addison, Ill.

[73] Assignee: Addison Machine Engineering, Inc., Addison, Ill.

[21] Appl. No.: 09/017,646

[22] Filed: Feb. 2, 1998

[51] Int. Cl.[7] .................................................. B23K 9/167
[52] U.S. Cl. ...................... 219/75; 219/123; 219/125.1; 219/137 R
[58] Field of Search .......................... 219/75, 123, 125.1, 219/125.11, 136, 137 R, 60 R, 61

[56] References Cited

U.S. PATENT DOCUMENTS

| | | | |
|---|---|---|---|
| 2,756,311 | 7/1956 | Persson et al. | 219/75 |
| 3,065,438 | 11/1962 | Anderson . | |
| 3,242,309 | 3/1966 | Anderson et al. | 219/75 |
| 3,349,213 | 10/1967 | Gorman | 219/125.1 |
| 3,544,752 | 12/1970 | Lehnert et al. | 219/60 R |
| 3,609,282 | 9/1971 | Trattner et al. | 219/75 |
| 3,641,309 | 2/1972 | Klebel | 219/123 |
| 3,931,489 | 1/1976 | Roderburg et al. | 219/125.1 |
| 4,004,125 | 1/1977 | Hood et al. | 219/125 |
| 4,136,273 | 1/1979 | Eujita et al. | 219/121 |
| 4,341,944 | 7/1982 | Breen | 219/123 |
| 4,621,181 | 11/1986 | Lachmitz | 219/62 |
| 4,811,888 | 3/1989 | Ziemek et al. | 228/148 |
| 5,191,185 | 3/1993 | John, Jr. | 219/60 |
| 5,204,508 | 4/1993 | Camacho | 219/121.59 |
| 5,218,181 | 6/1993 | Shintani | 219/121.54 |
| 5,263,631 | 11/1993 | Felber | 228/4.5 |
| 5,481,081 | 1/1996 | Ikegaya et al. | 219/121.48 |
| 5,641,417 | 6/1997 | Glagola et al. | 219/75 |
| 5,798,493 | 8/1998 | Heller, Sr. | 219/75 |

*Primary Examiner*—Clifford C. Shaw
*Attorney, Agent, or Firm*—Tilton, Fallon, Lungmus & Chestnut

[57] ABSTRACT

An assembly for welding includes a frame member and a plurality of repositionable torches supported by the frame member adjacent a linear path of travel of a metal strip. The method includes the steps of welding the metal strip, ascertaining the character of the weld and repositioning the torches to alter the character of the weld.

18 Claims, 6 Drawing Sheets

ASSEMBLY AND METHOD FOR WELDING

BACKGROUND OF THE INVENTION

1. Field of the Invention

The present invention relates to a torch assembly and a method of welding and, more particularly, to an assembly for tungsten inert gas welding.

2. Description of the Prior Art

Tungsten inert gas welding generally involves using a torch with a tungsten electrode and means for ejecting an inert gas such as argon or helium proximate the distal end of the electrode. The electrode generates an electric arc between its distal end and a metal while the inert gas forms a shielding atmosphere for the arc which melts the metal and forms a weld.

The prior art includes a wide variety of torch assemblies, including those that operate in production lines to fabricate products such as seamless pipes. In such applications, the character of the weld depends, in part, upon the speed of advance of the product. Additionally, ambient conditions may affect the structural and visual integrity of the weld joint.

The assembly of the present invention allows the rapid advance of the product that it welds while maximizing the structural and visual integrity of the welded joint. It uses a multi-electrode torch with linearly aligned electrodes, means for adjusting the inter-electrode spacing, and means for effectively discharging inert gas at the distal ends of the electrodes. The assembly of this invention is a simple, compact system that allows the continuous and effective welding of a product.

SUMMARY OF THE INVENTION

In accordance with one embodiment of this invention, a welding assembly includes a frame adjacent an elongate path of travel of strip means that the torch assembly welds and a plurality of torch means supported by the frame member in side-by-side relation, spaced along the path of travel. Each of the torch means has a relatively elongate body with a supply end and a work end. This torch means includes electrode means with a tip that extends beyond the work end of the body to arc with the strip means.

Each torch means body defines a bore with an outlet proximate the tip end of its electrode means. Inert gas flows through the bore and discharges out of the outlet around the electrode means tip. The inert gas shields the electric arc that forms between the tip and the strip means to facilitate the welding of the strip means. In the embodiment described below, the electrode means extends through the bore and out of the outlet.

The welding assembly also includes means operably associated with the torch means for varying the longitudinally spacing of the tips of two adjacent electrode means. This feature allows better control and variation of the timing between application of a first electric arc and subsequent electric arcs that the torch assembly produces in the welding operation.

The welding operation includes providing a plurality of electrode stations along the linear path of travel of the strip means and moving the strip means along the path and welding the strip means. It also includes the steps of ascertaining the character of the weld and varying the spacing of the stations along the path to alter the character of the weld.

BRIEF DESCRIPTION OF THE DRAWINGS

For a more complete understanding of this invention, one should now refer to the embodiment illustrated in greater detail in the accompanying drawings and described below by way of an example of the invention. In the drawings.

While the following disclosure describes the invention in connection with one embodiment and modifications of that embodiment, one should understand that the invention is not limited to this embodiment and modifications. Furthermore, one should understand that the drawings are not to scale and that graphic symbols, diagrammatic representations, and fragmentary views, in part, illustrate the embodiment. In certain instances, the disclosure may not include details which are not necessary for an understanding of the present invention, such as conventional details of fabrication and assembly.

DETAILED DESCRIPTION OF THE DRAWINGS

Figure 1:
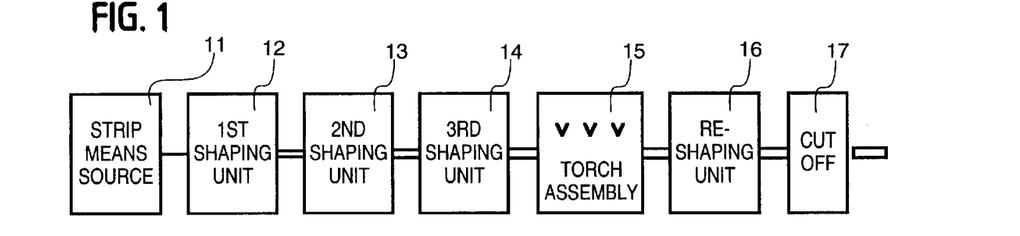
FIG. 1 is a schematic view of a production line that includes the welding assembly of the present invention.
Figure 2:
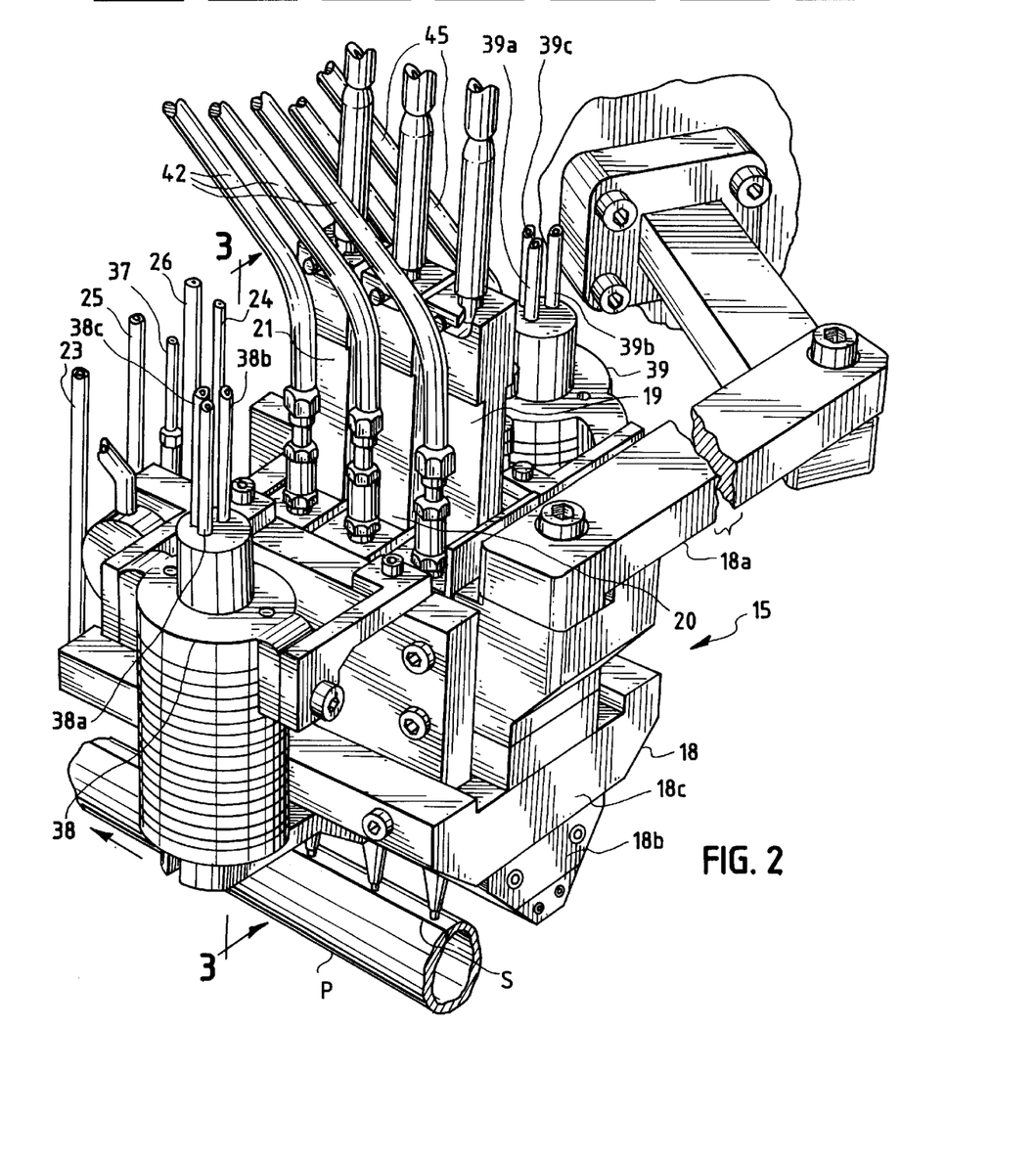
FIG. 2 is a perspective view of the welding assembly of the present invention.

Turning now to the drawings and referring specifically to FIGS. 1 and 2, a production lie that manufactures, for example, seamless stainless steel pipe includes a source of strip means (a flat, elongate strip of stainless steel) 11; a first shaping unit 12, a second shaping unit 13, and a third shaping unit 14, that bend the flat stainless steel strip into a round pipe P, as shown in FIG. 2; the welding assembly of the present invention 15 that closes a longitudinal seam S in the rounded pipe P; and a reshaping unit 16 and cut-off unit 17 which further shape the pipe P and cut it into predetermined lengths. A support secures each of the units in predetermined locations where they define a linear path of travel for the metal strip and the formed pipe.

The welding assembly of the present invention shown at 15 generally includes a frame member 18 and three torch members 19, 20, and 21 supported by the frame member proximate the linear path of travel of the metal pipe P. Each of the torch members 19–21 generates an electric arc with the metal pipe P. The first torch member 19 preheats the pipe; the second torch member 20 welds it in that the temperature along the seam S rises to a level at which the metal melts and bridges the seam S; and the third torch member 21 "washes" the pipe P (i.e., it finishes the weld to form a smooth, continuous surface for the pipe P).

The frame member 18 includes an articulated arm 18a that secures the frame member to the support that holds the welding assembly 15 and other components 11–14 and 16–17 of the production line. The frame member 18 also includes a bottom shoe segment 18b (See FIGS. 12 and 14) and a top body segment 18c (See FIG. 12). These segments 18b and 18c define a through passage 22 that receives the torch members 19–21. The torch members 19–21 lie in this through passage 22; and their bottom ends extend outwardly of the passage 22 (as shown in FIG. 3) to positions proximate the pipe P.

The torch members 19–21 generate a great deal of heat, some of which transfers to the frame 18. Thus, the body segment 18c defines passageways (not shown) that receive coolant from a supply pipe 23 and discharge it through a discharge pipe 24. Similarly, the shoe segment 18b of the frame member 18 defines passageways (not shown) that receive coolant from a supply line 25 and discharge it into a discharge pipe 26. In addition, various insulating plates shield the frame member 11 from the torch members 19–21.

Figure 3:
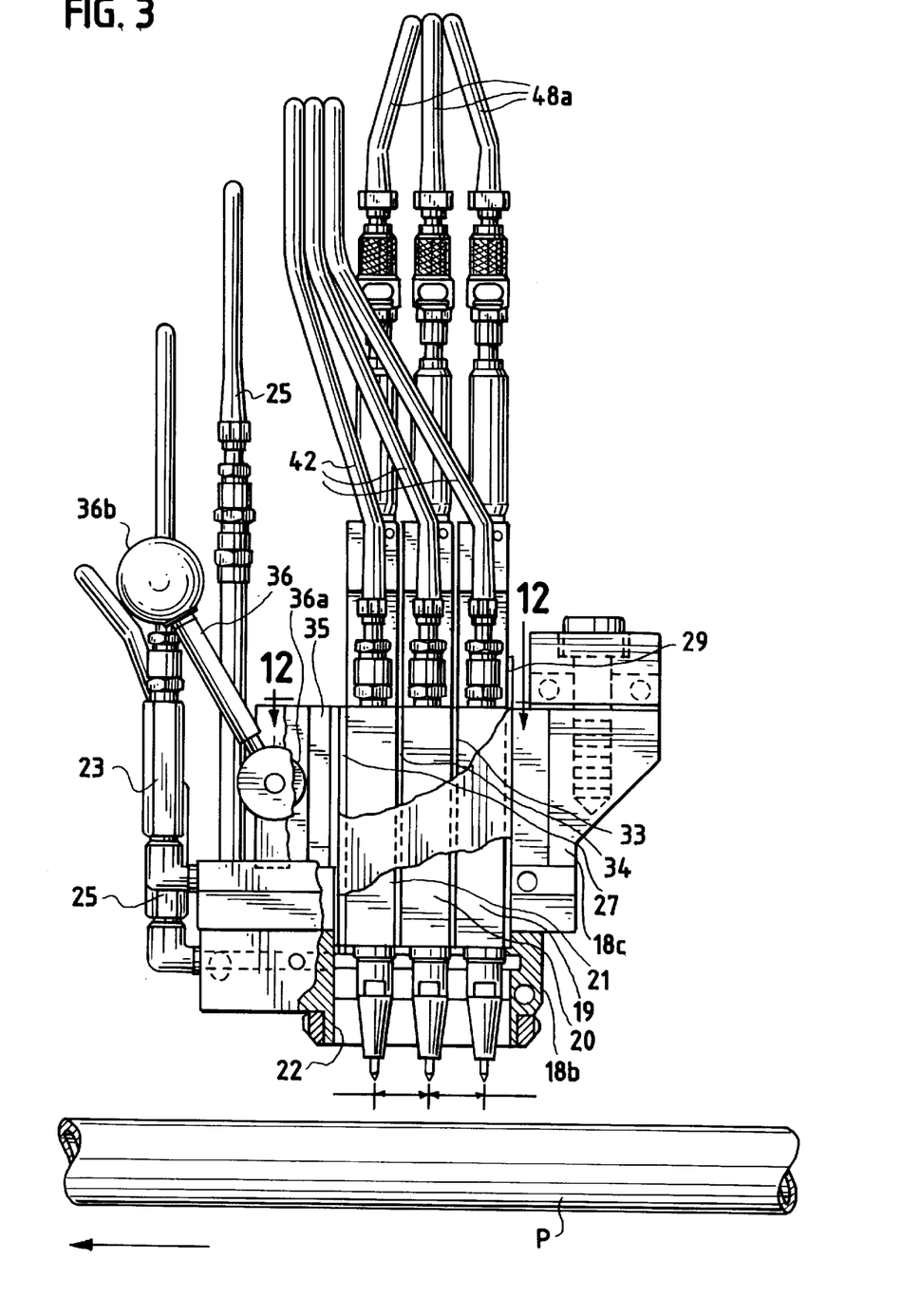
FIG. 3 is a sectional view taken along line 3—3 in FIG. 2.
Figure 12:
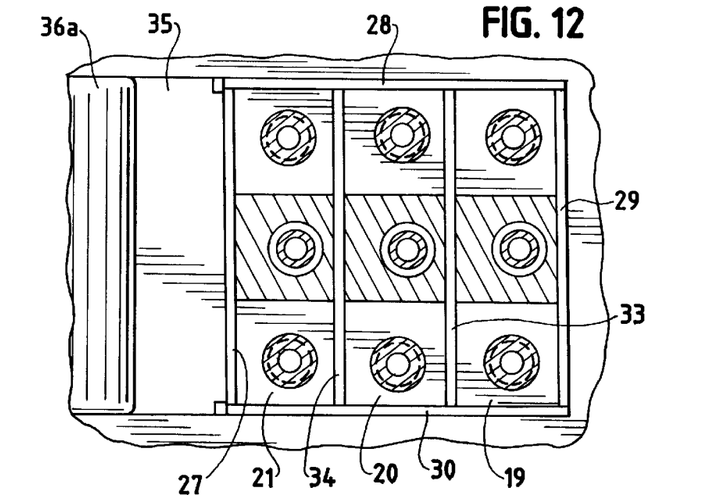
FIG. 12 is a sectional view taken along line 12—12 in FIG. 3.

The through passage 22 contains the insulating plates 27–30 which lie generally vertically between the torch members 19–21 and the sidewalls of the passage 22, as shown in FIGS. 3 and 12. In addition, it contains bottom insulating plates 31 and 32 that lie generally horizontally between the torch members 19–21 and a ledge 18d of the shoe segment 18b. (See FIGS. 13 and 14.) The through passage 22 also contains insulating plate 33 disposed between torch members 19 and 20 and an insulating plate 34 disposed between torch members 20 and 21.

To lock the torch members 19–21 and the insulating plates in place in the through passage 22, the welding assembly 15 includes a moveable bearing plate 35 and a locking arm 36 pivotally mounted to the body segment 18c. The bearing plate 35 moves horizontally from left to right in FIG. 3; it engages the insulating plate 27; and it transmits the force provided by the locking arm 36 to force the insulating plates 27, 29, 33 and 34 and the torch members 19–21 against each other and the opposite wall of the through passage 22. The locking arm 36 pivots from a release position shown in FIG. 3, clockwise, to a locking position not shown. A cam segment 36a disposed at one end of the locking arm 36 engages the bearing plate 35 and drives it as the arm 36 pivots clockwise. A ball segment 36b allows an operator to firmly grasp the arm 36 and move it as described above.

Figure 13:
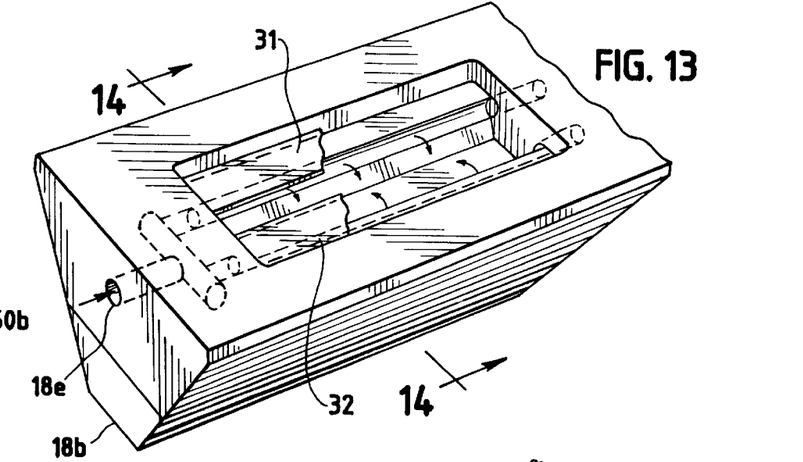
FIG. 13 is a perspective view of a shoe segment of a frame member that holds the torch members.
Figure 14:
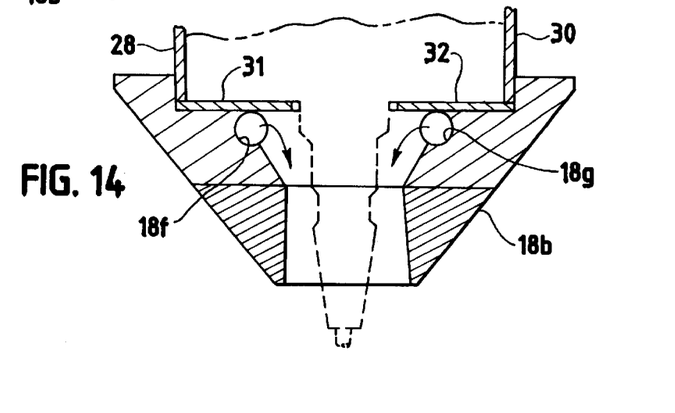
FIG. 14 is a sectional view taken along line 14—14 in FIG. 13.

The welding assembly 15 provides an inert gas atmosphere below the shoe segment 18b of the frame member 18. This atmosphere surrounds and protects the electric arcs provided by the torch members 19–21. A gas supply conduit 37 directs the gas into passageway 18e; the gas flows through the passageway 18e; and it discharges through outlets 18f and 18g, as shown in FIGS. 13 and 14. Each of the torch members 19–21 further provides a curtain of inert gas around the area immediately adjacent the arc that it generates, as described below.

Two magnetic coil members 38 and 39 help direct and focus each electric arc generated by each of the torch members 19–21 towards the pipe P. The coil members 38 and 39 lie fixedly secured to the body segment 18c of the frame member 18 on opposite sides of the torch members 19–21 (See FIG. 2). The coil member 38 includes an electric supply conduit 38a, a coolant supply pipe 38b and a coolant discharge pipe 38c. Similarly, the coil member 39 includes an electric supply conduit 39a, a coolant supply pipe 39b and a coolant discharge pipe 39c.

FIGS. 4–10 show the construction of the torch member 19; but the other two torch members 20 and 21 have the same construction. (In addition, although the welding assembly embodiment shown includes three torch members, it may alternatively include less or more than three torch members.) The torch member 19 generally includes an elongate body 40 and an elongate electrode 41 that extends through a central bore 40a of the body 40. The body 40 allows easy mounting on the frame member 18; and the electrode effectively delivers an electric arc to the pipe P.

The torch member body 40 has a flat, generally rectangular configuration. It includes a main segment 40b having rectangular shoulders 40c–f and an inlet tube portion 40g; and it includes a tip segment or chuck 40h threaded into the main segment 40b. The main segment 40b defines a coolant passageway, including a bore 40i, a bore 40j and a connecting bore 40k. The bore 40i receives coolant through a conduit 42 (including a fitting 42a); and it contains a helical slinger 43 that facilitates coolant flow. The coolant discharges through the bore 40j (which also contains a slinger 44) and a conduit 45 (including a fitting 45a).

Figures 4, 5, 6:
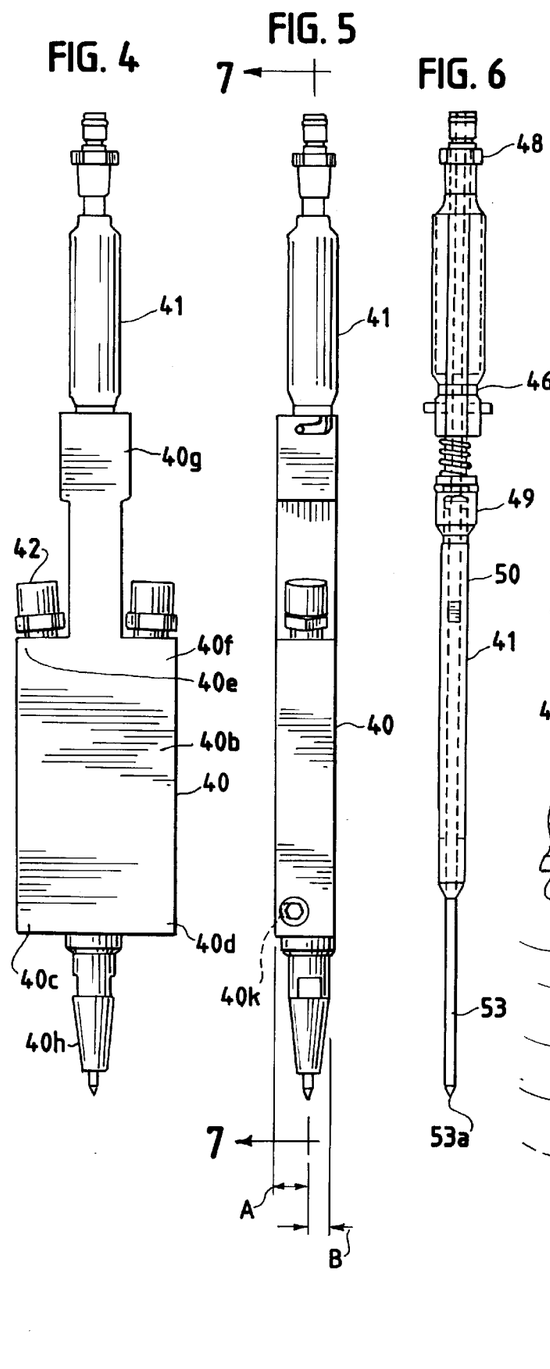
FIG. 4 is a side elevation view of a torch member used in the welding assembly of the present invention.
FIG. 5 is another side elevation view of the torch member shown in FIG. 4 (with the side of this figure being perpendicular to the side shown in FIG. 4)
FIG. 6 is a side elevation view of the electrode used in the torch member of FIGS. 4 and 5.

The bore 40a that extends through the body 40 lies on the longitudinal centerline of the side shown in FIG. 4; but it lies off-set a predetermined distance away (to the right) from the centerline of the side shown in FIG. 5. In other words, the dimension A is greater than the dimension B in FIG. 5. Since the torch members lie in side-by-side relation with the face shown in FIG. 4 disposed adjacent a similar face of the adjacent torch member, a 180° rotation of a torch member changes the spacing between the top segments 40h of the torch members and accordingly the spacing of the electrode tips that arc with the pipe P.

The electrode 41 generates the electric arc provided by the torch member, and it cooperates with the body 40 to define a passageway for inert gas that forms a curtain-like barrier around the arc. (See FIGS. 6, 7 and 10.) It comprises a top outer tube 46, including studs 46a and 46b that cooperate with slots 40l and 40m of the inlet tube portion 40g to releasably secure the electrode 41 to the body 40. A top inner tube 47 extends through the outer tube 46 in sliding engagement with the tube 46. A fitting 48 connects the top end of the tube 47 to a conduit 48a that supplies inert gas and has an internal cable that provides current to the tube 47. A coupling tube 49 connects the bottom end of the top inner tube to a bottom tube 50. The coupling tube 49 supports an O-ring 51 that prevents inert gas from flowing upwardly, as described below.

Figure 7:
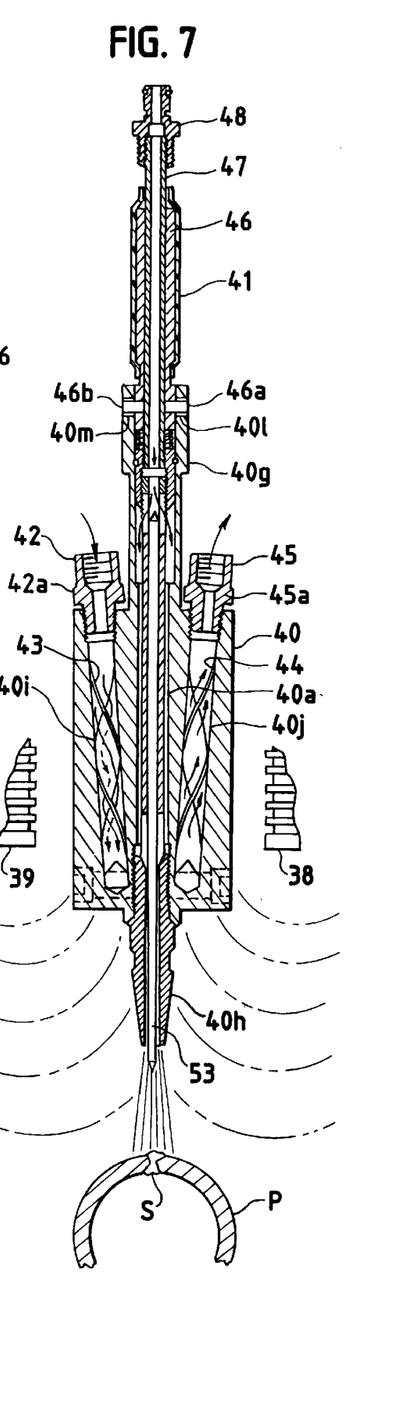
FIG. 7 is a sectional view taken along line 7—7 in FIG. 5.

A compression spring 52 drives the tubes 47, 49 and 50 downwardly with respect to the body 40 so that the bottom end 50a of the bottom tube 50 engages the frostoconical seat at the top end of the tip segment 40h of the body 40. This end 50a has four slits 50b cut into it, facilitating the pinching and severing of a tungsten rod 53. This rod 53 forms the bottom tip of the electrode 41 and extends through a central bore in the tip segment 40h. The distal end 53a of the rod 53 extends below the bottom end of the tip segment 40h a predetermined distance above the pipe P as shown in FIG. 7.

Figure 8:
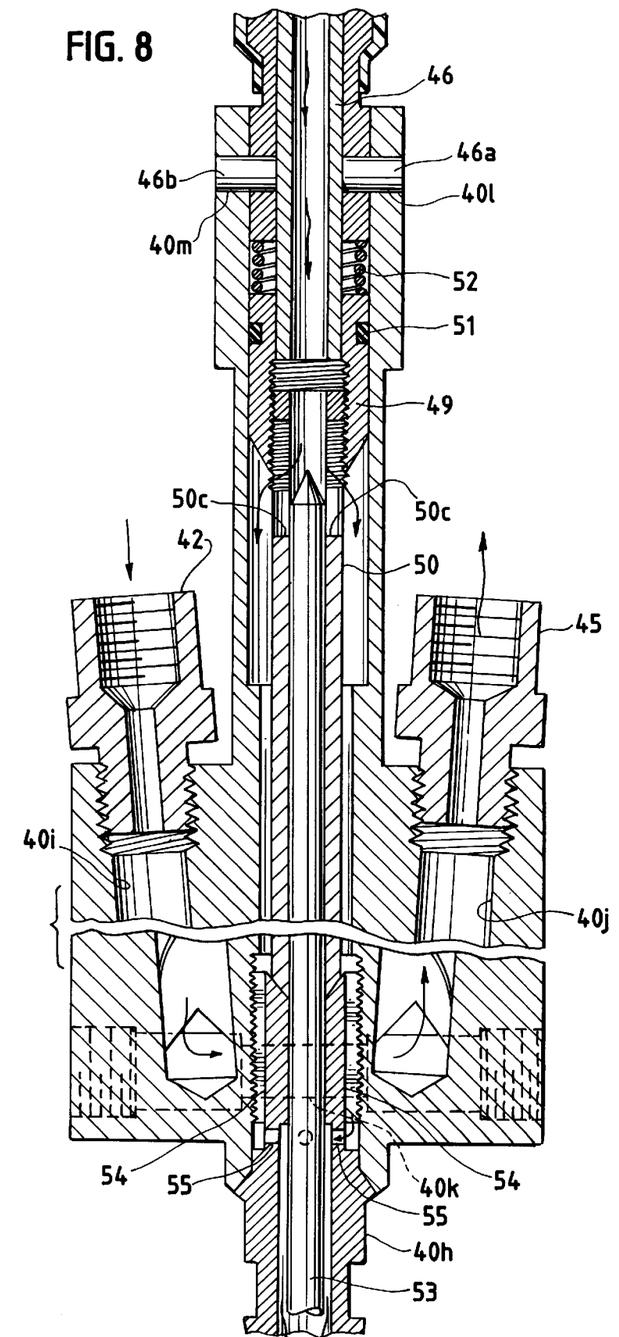
FIG. 8 is an enlarged view of the cross-sectional view shown in FIG. 7.
Figure 9:
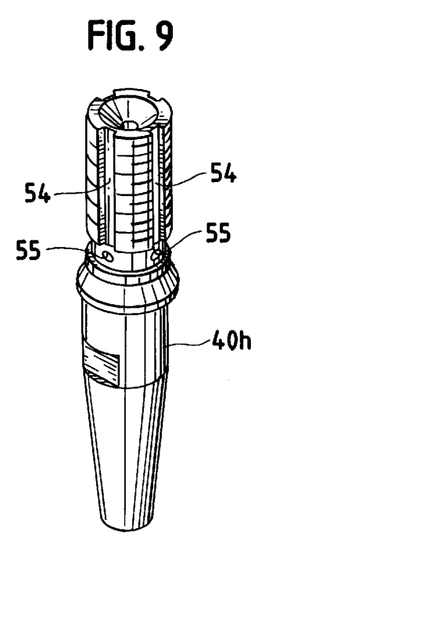
FIG. 9 is a perspective view of the bottom end of the torch member body shown in FIGS. 4, 5 and 7.
Figure 10:
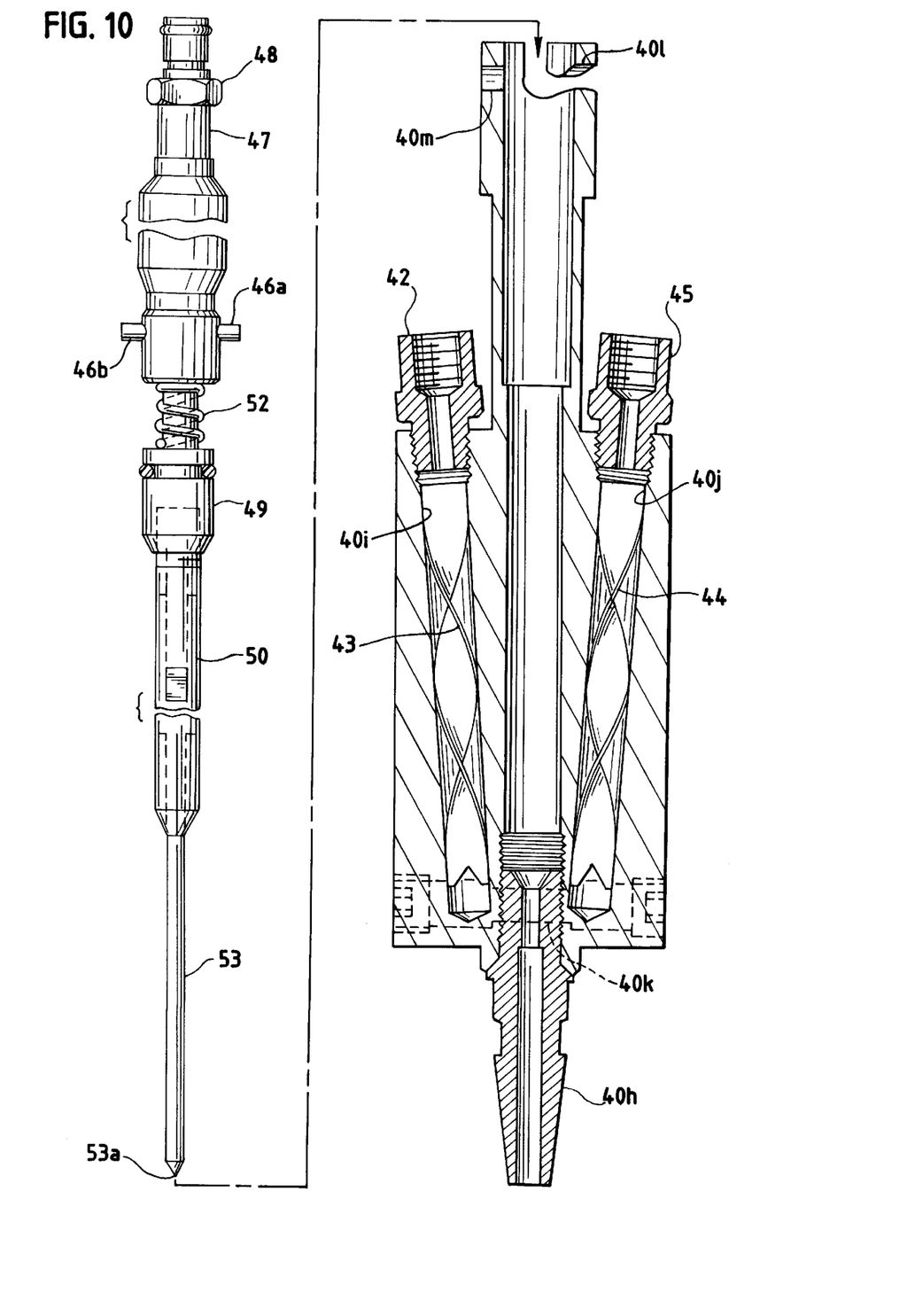
FIG. 10 is an exploded view of the torch member body and the electrode that extends through the body.
Figure 11:
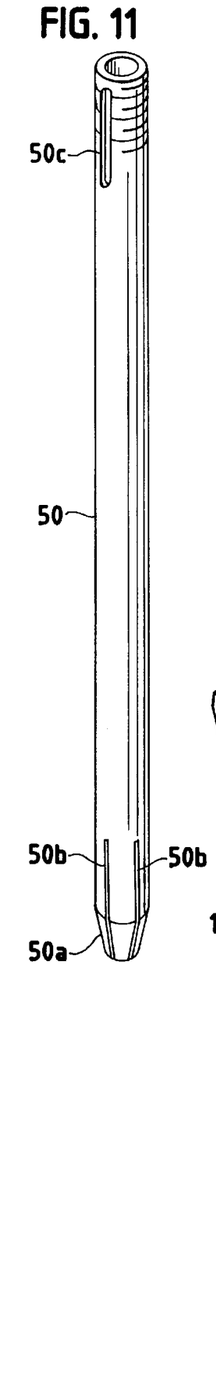
FIG. 11 is a partial perspective view of a portion of the torch assembly, showing an opening through which gas flows from a central bore of the electrode to a passageway between the electrode and the torch member body.

As shown in FIG. 8, inert gas flows through the center of top inner tube 47 into the top of the bottom tube 50 then out of the tube 50 through openings 50c and into a passageway defined by the walls of the bore 40a in the body 40 and the outside surface of the tube 50. The gas then flows into grooves 54 formed in the outer surface of the tip segment 40h of the body 40 and into openings 55 that connect the grooves 54 with the bore that extends through the center of the tip segment 40h. The gas continues to flow downwardly between the rod 53 and the walls of the central bore in the tip segment 40h until it discharges around the distal end of the rod 53, providing a curtain-like barrier for the electric arc that the rod generates.

By way of a specific example, a torch member was fabricated with an electrode end rod 53 of 0.156 inches diameter, a bore (through which the bottom of the bottom tube 50 extends) of 0.370 inches diameter, an outside diameter for the bottom tube 50 of 0.250 inches, a top part of the central bore in the tip segment 40h of 0.1590 inches diameter and a bottom part of 0.234 inches diameter, grooves 54 of 0.062 by 0.053 inches, and openings 55 of 0.073 inches diameter.

While the above description and the drawings disclose and illustrate one embodiment and various modifications, one should understand, of course, that the invention is not limited to this embodiment and modifications. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A welding assembly comprising: a frame member, and a plurality of torch members supported by the frame member in side-by-side relation proximate a path of travel of a strip to be welded, each torch member including an electrode with a tip, the frame member having a through passage extending in a direction transverse to the path of travel, the torch members being repositionable in the passage to vary the spacing of the electrode tips longitudinally of the path of travel; the frame member being equipped with clamp means for fixing the positions of the torch members; each of the torch members including a body with an electrode-receiving bore extending between body ends, each body having a rectangular shoulder between said body ends for receipt in said through passage; the bore of each body being offset from the longitudinal axis defined by the intersection of the diagonals of the rectangular shoulder in at least one of said torch members whereby 180° rotation of the one torch member about its longitudinal axis will vary the spacing between its tip and the tip of an adjacent torch member.

2. The assembly of claim 1 in which the body shoulder is equipped with coolant liquid flow passages flanking the body bore, and conduit means connected to the flow passages for introducing and removing the coolant liquid.

3. The assembly of claim 2 in which each of the flow passage is equipped with slinger means.

4. The assembly of claim 3 in which the slinger means is an elongated helix.

5. The assembly of claim 2 in which the conduit means is internally equipped with cable means for delivering power to the electrode.

6. The assembly of claim 1 in which the frame member is equipped with a pair of magnetic coil means for providing a magnetic field on each side of each electrode tip.

7. The assembly of claim 1 in combination with support means for providing the path of travel, strip source means on the support means at one end of the path for providing the strip means followed by strip shaping means for shaping the strip means and said welding assembly.

8. A welding assembly comprising: a frame member having means for mounting adjacent an elongate path of travel of strip means to be longitudinally welded, said frame member having a through passage extending in a direction transverse to the path for receiving at least three separate torch members in side-by-side relation spaced along the path; the torch members being relatively elongate in the transverse direction mounted in the through passage and each having a body with a supply end and a work end, each torch member being equipped with an electrode, each electrode also being relatively elongate in the transverse direction and having a tip extending beyond the work end of the body to arc with the strip means; at least two of the torch members being repositionable in the passage to allow an exchange of locations of the two torch members and a different side-by-side arrangement with different spacing between the electrodes.

9. Apparatus for tungsten inert gas welding of continuous metal strip means comprising a support defining a linear path, a source of metal strip means at one end of the path, means in the path for advancing the metal strip means in the path toward a torch assembly while shaping the metal strip means into a predetermined shape, a torch assembly downstream of the path including a frame member on the support having a through passage, three separate and elongated electrode-carrying torches mounted in the through passage, means on the frame member for releasably clamping the torches with their lengths extending perpendicularly to the linear path, each torch electrode having a tip positioned adjacent the metal strip means in the path to create a plasma-developing arc with the strip means, the torches and frame member cooperating to allow rearrangement of the torches from one location to another and thus develop a different intertip spacing.

10. The assembly of claim 9 wherein each torch includes an electrode receiving bore offset from the longitudinal axis of the torch.

11. A method of tungsten inert gas welding comprising the steps of providing a linear path of travel for a metal product to be welded, providing a plurality of repositionable electrode stations along the path, moving the metal product along the linear path of travel, ascertaining the character of the weld being developed by the stations, and relocating the electrode stations along the path to alter the character of the weld being developed.

12. The method of claim 11 in which the electrode stations include a pre-heat station, a welding station, and a wash station; and the steps include altering the spacing between the welding and wash stations.

13. The method of claim 11 in which the steps include providing an electrode-equipped torch for each of the stations with each torch having a longitudinal center line, providing a bore in each torch offset from its center line, and relocating a first torch to change the electrode spacing between the first torch and a second torch.

14. A torch member for a welding assembly comprising: a body segment defining a bore for carrying inert gas; and electrode means disposed in the bore and including a tip that extends outwardly of the bore and the body segment; the electrode means and the bore defining a passageway with a discharge outlet for the inert gas, the bore being offset from a longitudinal axis of the body segment the discharge outlet being constricted relative to the remaining passageway and extending around the electrode tip to discharge inert gas around the tip with a greater velocity than the velocity of the gas when it enters the bore.

15. The torch member of claim 14 in which the body has a rectangular shoulder equipped with coolant liquid flow passages flanking the bore, and conduit means connected to the flow passages for introducing and removing coolant liquid.

16. The torch member of claim 15 in which each of the flow passages is equipped with slinger means.

17. The torch member of claim 16 in which the slinger means is an elongated helix.

18. The torch member of claim 15 in which the conduit means is internally equipped with cable means for delivering power to the electrode means.

\* \* \* \* \*